June 9, 1925.  1,541,492
D. J. GUENTHER
METHOD OF PACKING FRESH FRUIT AND PAD THEREFOR
Filed Aug. 19, 1924
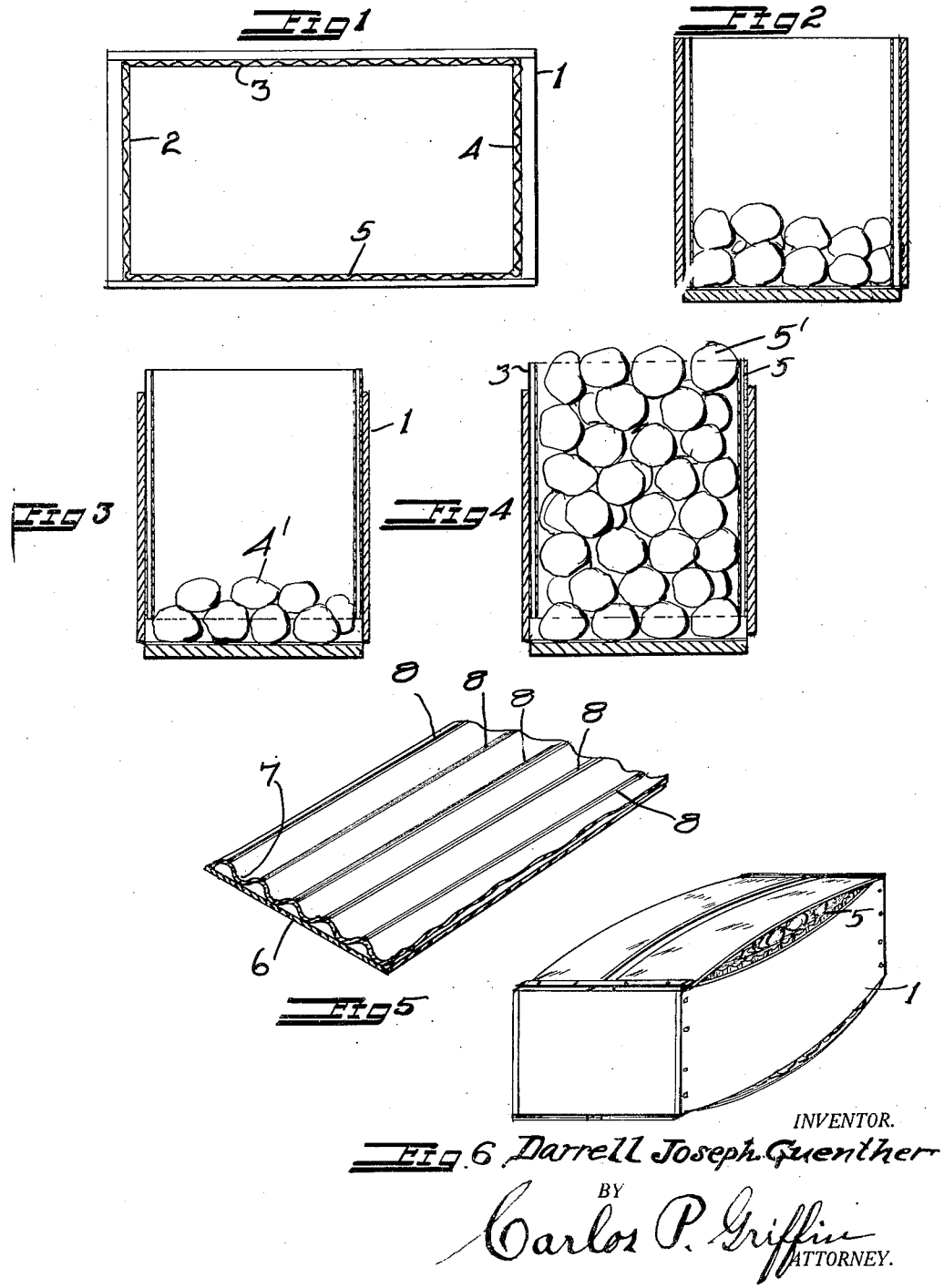
INVENTOR.
Darrell Joseph Guenther
BY
Carlos P. Griffin
ATTORNEY.

Patented June 9, 1925.

1,541,492

UNITED STATES PATENT OFFICE.

DARRELL JOSEPH GUENTHER, OF SAN FRANCISCO, CALIFORNIA, ASSIGNOR TO SCHMIDT LITHOGRAPH COMPANY, OF SAN FRANCISCO, CALIFORNIA, A CORPORATION OF CALIFORNIA.

METHOD OF PACKING FRESH FRUIT AND PAD THEREFOR.

Application filed August 19, 1924. Serial No. 732,948.

*To all whom it may concern:*

Be it known that I, DARRELL JOSEPH GUENTHER, a citizen of the United States, residing at 119 Parnassus Ave., in the city and county of San Francisco, State of California, have invented new and useful Methods of Packing Fresh Fruit and Pads Therefor, of which the following is a specification, in such full and clear terms as will enable those skilled in the art to construct and use the same.

This invention relates to a cushion or pad used in the sides and ends of fruit boxes, and its object is to provide means whereby the fruit may be protected from injury while being tightly packed in the container and whereby the fruits will be more completely padded to prevent injury during shipment.

It will be understood by those skilled in the art that in packing certain kinds of fresh fruit such as pears and apples that a corrugated paper pad has been used in the bottom and top of the box to protect the fruit against bruising when the top is being placed in position and secured in place.

In packing such fruits as are above mentioned the fruit is placed in the box in layers and when the packing is finished the fruit is piled up about one layer above the top of the box. The cover is then placed above the top layer of fruit and the container is then placed in a press which presses the cover down enough to allow the cover to be nailed to the box. This pressure causes the fruits to be pushed downwardly with respect to the box and causes both top and bottom of the box to have a considerable bulge, the sides also being bulged but not quite so much as the top and bottom.

As the fruit is being pushed down those fruits which are in contact with the sides and ends of the box necessarily meet some friction and are rubbed in such a way as to start them spoiling at once. In addition all those fruits which are on the edge of the top layer adjacent the sides of the box will be likely to be injured by the upper edge of the box sides and ends.

Some attempt has been made to prevent this injury at the ends and corners of the box, but in the present instance a pad is used which not only protects the fruits in the upper layer where they are likely to contact with the upper edges of the box but the pad also protects all those fruits on the ends and sides of the box against injury by rubbing when pressure is applied to the box.

In the present invention a corrugated pad consisting of a single flat layer of paper stock with a layer of corrugated stock glued thereto is used, and in order to allow the paper stock to slide down into the box as the fruit is pressed thereinto the ridges of the corrugated paper stock are treated with a wax which makes the side padding slippery enough to be carried down with the fruit, thereby preventing any friction from injuring the fruit.

The cost of packing the fruit must of course be kept as low as possible and consequently the packing must effect the object with as little paraffine as possible, and this is done by placing the paraffine only on the tips of the corrugations, thereby using only about 25% of the paraffine that would be required if the entire area of the corrugated member were paraffined.

Other objects of the invention will appear as the description proceeds.

An embodiment of the invention is shown in the accompanying drawings in which the same reference numeral is applied to the same portion throughout, but I am aware that there may be modifications thereof.

Figure 1 is a plan view of a box, also with this side pad installed therein.

Figure 2 is a sectional end view of the box shown in Figure 1, showing the fruits in place.

Figure 3 is a sectional view showing the fruits in place and illustrating the manner of raising the pads at the edges when the first layer of fruit is packed.

Figure 4 is a sectional end view of pad showing the box and pad filled and illustrating the position occupied by the last layer of fruit therein.

Figure 5 is a view of a section of the corrugated padding in perspective.

Figure 6 is a perspective view of a completely packed box showing the appearance of this padding and showing the appearance of the box when first packed.

The numeral 1 represents the box, and the padding therein is indicated therein at 2, 3, 4 and 5, and consists of a corrugated paper strip long enough to pass entirely around the box once inside the same, the corrugations being placed vertically.

The operators take the boxes and place one of these pads therein, starting to fill it up as shown at 4 in Figure 3, whereupon as soon as the lower layer of fruit is packed, the pad is raised as shown in Fig. 3. The box is then filled to the level, indicated at 5'. It will be seen that the fruits of the upper layer are likely to be gouged by the upper corners of the edges of the boxes when the fruit is under pressure, but the pad 1 prevents the fruit from coming in contact with the inside of the box and with its inside edges, both upper and lower.

In actual practice the fruits are squeezed down from one inch to two inches and the side padding must of course be crowded down a like amount.

If this side padding is made of an ordinary paper stock, it will stick to the sides of the box and will not crowd down but with the present invention shown in Figure 5, there is a straight back 6 and a corrugated front 7; the corrugated front having a plurality of lines 8, which consist of the high places of the corrugations covered with paraffine wax. This allows the side to slip down as it should and does not bruise the fruit.

I am aware that various modifications may be made in the quality of the material that may be used for the padding, but the cost of this method of packing is so considerable and the margin so small that very thin corrugated board must necessarily be used.

In the present invention the operation of the invention is as follows:

The packer takes a box, places a pad in the bottom of the box, if those pads are used, then places one of the pads disclosed herein around the inside of the sides and ends of the box. The packer thereupon places one layer of fruit in the bottom of the box and then raises the side and end padding about one-half the thickness of the first layer of fruit. The packing is then completed and when the last layer of fruit is placed in position it will be about two inches higher than the top of the box.

A top pad is then placed on the top layer of fruit and the box is then placed in a press to squeeze the fruit down tightly, to bring the top, bottom and sides of the fruit box to the position shown in Figure 6, whereupon the top can be nailed to the ends of the box.

At this time the fruits on the sides and ends are ordinarily bruised by rubbing on the sides and ends of the box when the pressure is applied, and the fruits on the upper edge will be injured by the upper edges of the box. This effect in both instances is completely avoided by these pads, for as the pressure is applied the side and end pad will slip downwardly on the inside of the box and there will be no motion of the pad with respect to the fruit, also at the same time the pad will finally project above the top of the sides of the box slightly, thereby preventing any fruit from contacting with the upper edges of the box sides.

It is necessary to use as little paraffine as possible upon the corrugated member in order to prevent it from marking the fruit, since if it is completely corrugated it is likely to be so stiff that it will not crush down properly.

What I claim is as follows, but modifications may be made in carrying out the invention and in the above particularly described form thereof, within the purview of the invention as defined by the annexed claims:

1. In a pad for packing fruit in boxes, a paper board, flat on one side and corrugated on the other side, the ridges of the corrugations having a material thereon to make them slide easily when packing box of fruit.

2. In a pad for packing fruit in boxes, a paper board flat on one side and corrugated on the other side, the corrugated side of the pad having lines of a material thereon to cause the pad to slide easily when packing a box of fruit.

3. In a pad for packing fruit in boxes, a paper board flat on one side and corrugated on the other side, the ridges of the corrugations having an antifriction material placed thereon to cause the pads to slip in the box easily when the fruit is being packed.

4. In a pad for packing fruit in boxes, a paper board flat on one side and having corrugations on the other side, said corrugations having a wax placed thereon on the raised portions thereof whereby the pads will slip easily into the box in contact with the contained fruit when the cover is being placed thereon.

5. In a pad for packing fruit in boxes, a paper board flat on one side and having corrugations on the other side, said corrugations being waxed in parallel lines to allow the pads to slide on the inside of the box in contact with the contained fruit when the fruit is being compressed.

6. A method of packing fruit which comprises placing a liner in the box with its upper edges above the edge of the box, and with its lower edge slightly above the bottom of the box, filling the box with fruit and then pressing the fruit and liner down into the box and securing the top thereon.

7. A method of packing fruit in a box which comprises placing a liner in the box, placing a layer of fruit in the bottom of the box, raising the liner slightly, filling the box with fruit and then pressing the fruit and liner down into the box and securing the cover thereon.

8. A method of packing fruit which comprises placing a stiff liner entirely around the sides and ends of the inside of a box, placing a layer of fruit in the box, raising the liner slightly, completing the packing, pressing the fruit and liner down into the box and then securing the top in place.

In testimony whereof I have hereunto set my hand this 8th day of August, A. D. 1924.

DARRELL JOSEPH GUENTHER.